United States Patent [19]
Plodowski

[11] 3,969,900
[45] July 20, 1976

[54] BREAKWATER CONSTRUCTION

[75] Inventor: Tomasz Plodowski, Upper Montclair, N.J.

[73] Assignee: Raymond International, Inc., Houston, Tex.

[22] Filed: Aug. 29, 1974

[21] Appl. No.: 501,829

[52] U.S. Cl. .................................. 61/4; 61/102
[51] Int. Cl.² .................................. E02B 3/06
[58] Field of Search ............ 61/4, 5, 39, 46, 50

[56] References Cited
UNITED STATES PATENTS

| 137,659 | 4/1873 | Cunningham | 61/4 |
| 875,699 | 1/1908 | Dumais | 61/46 X |
| 1,706,246 | 3/1929 | Miller | 61/46 |
| 2,474,786 | 6/1949 | Humphrey | 61/4 |
| 3,393,520 | 7/1968 | Buttenworth | 61/4 |
| 3,429,128 | 2/1969 | Stafford et al. | 61/46 |
| 3,465,530 | 9/1969 | Renfro | 61/4 |
| 3,640,075 | 2/1972 | La Peyre | 61/5 |

Primary Examiner—Paul R. Gilliam
Assistant Examiner—Alexander Grosz
Attorney, Agent, or Firm—Fitzpatrick, Cella, Harper & Scinto

[57] ABSTRACT

A breakwater construction comprising hollow tank like modules of nearly neutral buoyancy and connected to the sea bed by means of pile like members. The buoyancy distribution of the modules is established such that they tend to tilt against the direction of wave action. This tendency to tilt in turn acts to prestress the pile like members.

15 Claims, 5 Drawing Figures

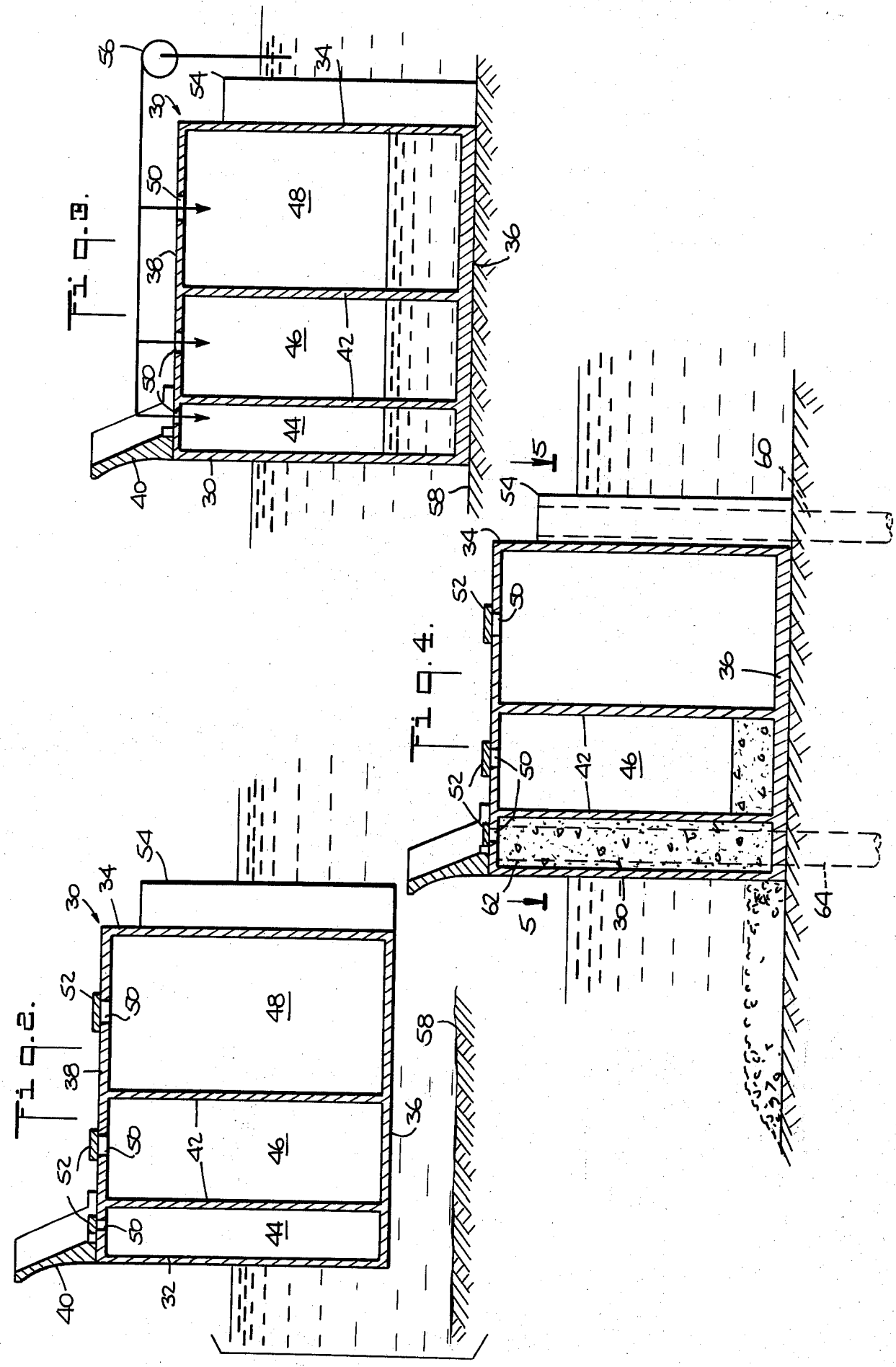

BREAKWATER CONSTRUCTION

BACKGROUND OF THE INVENTION

1. Field of the Invention

This invention relates to undersea construction and more particularly it concerns novel methods and apparatus relating to breakwaters.

2. Description of the Prior Art

A breakwater is an elongated massive structure or formation in the sea, usually located near a coast, which rises above the surface of the sea to resist wave action. Thus while the sea may be rough with high waves on one side of the breakwater i.e. the seaward side, the water on the other side, i.e. the landward side, remains relatively calm. Breakwaters thus are used to form artificial harbors for allowing the docking and mooring of large sea going vessels.

In the past, breakwaters have been constructed by the application of fill material, e.g. stones, cement, boulders, etc., to a predetermined location on the sea bed, and continuing this application until there is built up a mound which rises from the sea bed to a predetermined height above the sea surface. Often this basic construction technique would be refined by the use of cribs, i.e. open framework structures, to contain the fill material. Also, poured concrete has been employed to provide well defined upper surfaces on the breakwater so that docking and unloading of vessels can be carried out.

Difficulties are experienced with prior breakwater structures where the sea bed on which a structure is to rest does not have substantial bearing strength. In such case the structure actually sinks down into the sea bed. Additional fill material is then required to build up the breakwater; but this adds further to its weight so that it sinks even deeper.

SUMMARY OF THE INVENTION

The present invention provides a novel breakwater construction which does not rely upon the bearing strength of the sea bed for support. Instead, according to the present invention, novel arrangements are provided whereby the sea itself is used, through buoyant action to sustain the major portion of the weight of the breakwater. These novel arrangements include a main module of substantially neutral bouyancy and having an upstanding wall-like surface for resisting wave action. The module is positioned such that its wall like surface extends from a location below the sea surface to a location above the sea surface to encounter sea waves. The module is formed with front and rear portions displaced from each other in a direction transverse to the plane of the wall-like surface. A plurality of pile members extend down from the front and rear portions of the module and into the sea bed therebelow to a depth sufficient to attain resistance to lateral movement of the main module. The bouyancy distribution of the module is arranged such that the front portion thereof, that is, the portion upstream of wave action, is of negative, i.e., sinking, buoyancy while the rear portion thereof is of positive buoyancy. This imposes a tilting force on the module in a direction counter to the forces produced by wave action.

According to a preferred embodiment the buoyancy distribution of the module is controlled such that the forwardmost pile-like members are prestressed in compression while the rearward pile members are prestressed in tension. As a result, the wave action of the sea in pressing against the wall-like surface acts in an untilting manner so that the stresses in the piles become relieved and the structure is enabled to withstand high sea forces.

With the above described construction a breakwater of any desired length and configuration can be built simply by installing several such modules adjacent each other at a particular site.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures or methods for carrying out the several purposes of the invention. It is important, therefore, that the claims be regarded as including such equivalent constructions and methods as do not depart from the spirit and scope of the invention.

BRIEF DESCRIPTION OF THE DRAWINGS

One embodiment of the invention has been chosen for purposes of illustration and description, and is shown in the accompanying drawings forming a part of the specification, wherein:

FIG. 2 is a section view, taken in elevation, of a module forming one portion of the breakwater of FIG. 1, being floated into position during a breakwater construction operation;

FIG. 3 is a view similar to FIG. 2 showing the module sunk to the sea bottom in a subsequent step during the breakwater construction operation;

FIG. 4 is a view similar to FIGS. 2 and 3 showing the installation of pile members to secure the module in a final step of the breakwater construction operation.

DETAILED DESCRIPTION OF PREFERRED EMBODIMENT

Figure 1:
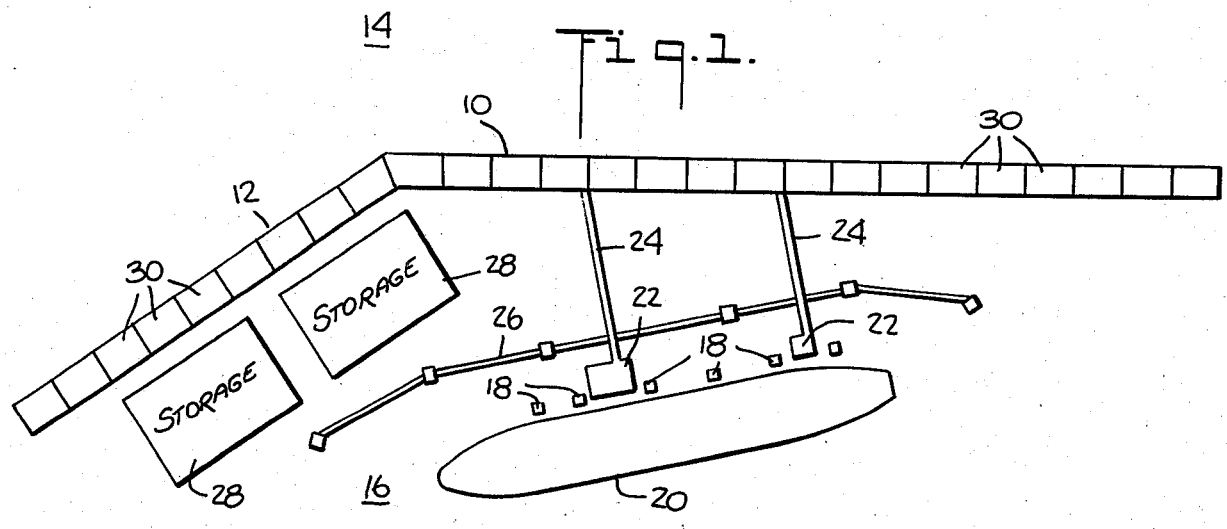
FIG. 1 is a plan view of a breakwater and docking facility in which the present invention is embodied.

The breakwater and docking facility shown in FIG. 1 comprises an elongated main breakwater section 10 and a somewhat shorter breakwater extension 12. These sections are arranged end to end but are obtusely angled with respect to each other. As indicated in the drawing the main section 10 is arranged parallel to the prevalent line of wave action from the sea while the breakwater extension 12 is parallel to secondary wave action. Outside the breakwater is open sea 14 which is subject to variable wave action. The breakwater serves to withstand this wave action and to form a protected region 16 within which ships may safely be moored.

As shown, there are provided several mooring dolphins 18 to which a ship 20 is moored within the protected region 16. Loading platforms 22 are constructed to lie alongside the ship 20 at mooring for transfer of personnel and material to and from the ship. These loading platforms are connected, by means of bridges or walkways 24, to the breakwater. Pipelines 26 are also provided, along with storage tanks 28 for handling of liquids, such as oil, when transferred to or from the ship.

The main breakwater section 10 and the extension 12, as shown in FIG. 1, are each made up of a plurality of modules 30 positioned side by side in a line along the length of the main section 10 and the extension 12. In constructing the breakwater, these modules are individually formed at a remote location, such as on shore; and they are separately brought out to the breakwater location and assembled together to form the overall breakwater structure.

The overall construction of the individual modules 30 is shown in the cross section view of FIG. 2. As can be seen, these modules are of hollow tank-like configuration; and they are preferably formed of cast concrete or similar heavy material. The modules 30 each have an upstanding sea wall 32 and a rear wall 34. The sea wall 32 extends along a forward portion of the module and faces outwardly toward the open sea 14. The rear wall 34 in turn extends along a rearward portion of the module and faces away from the open sea. It will be appreciated that the forward and rearward portions of the module 30 are displaced from each other in the direction of wave action from the sea. Bottom and top walls 36 and 38, and side walls (not shown) serve to enclose the hollow interior of the module, so that the module itself is in the form of a closed container. A reinforced splash wall 40 extends upwardly a short distance from the upper edge of the sea wall 32 and serves to intercept the crests of waves from the open sea 14. Vertical divider membranes 42 extend between the bottom and top walls 36 and 38 to divide the hollow interior of the module into seawall, fore and aft compartments 44, 46 and 48. Hatches 50 lead through the top wall 38 into these compartments. These hatches are closed by covers 52. A rear pile housing 54 is connected to the outside of the rear wall 34. This pile housing is of hollow tubular configuration and is open at its upper and lower ends.

As can be seen in FIG. 2, the hollow interior of the module 30 provides sufficient buoyancy to allow the module to be floated out to sea and brought to the breakwater location. Thereafter, as shown in FIG. 3, the hatch covers 52 are removed and sea water is pumped, by means of a pump 56, into the various compartments 44, 46 and 48. As the compartments fill with water, the buoyancy of the module decreases and the module begins to sink down to a sea bed 58. The pumping is controlled so that just enough water comes into the interior compartments to bring the module to neutral or only slightly negative buoyancy. Thus the module comes to rest very lightly on the sea bed 58 without imposing any appreciable bearing pressure on the sea bed. When the module 30 is sunk thusly, its sea wall 32, together with the splash wall 40, extends from below the sea level to above the sea level thereby to engage waves from the sea.

Figure 5:
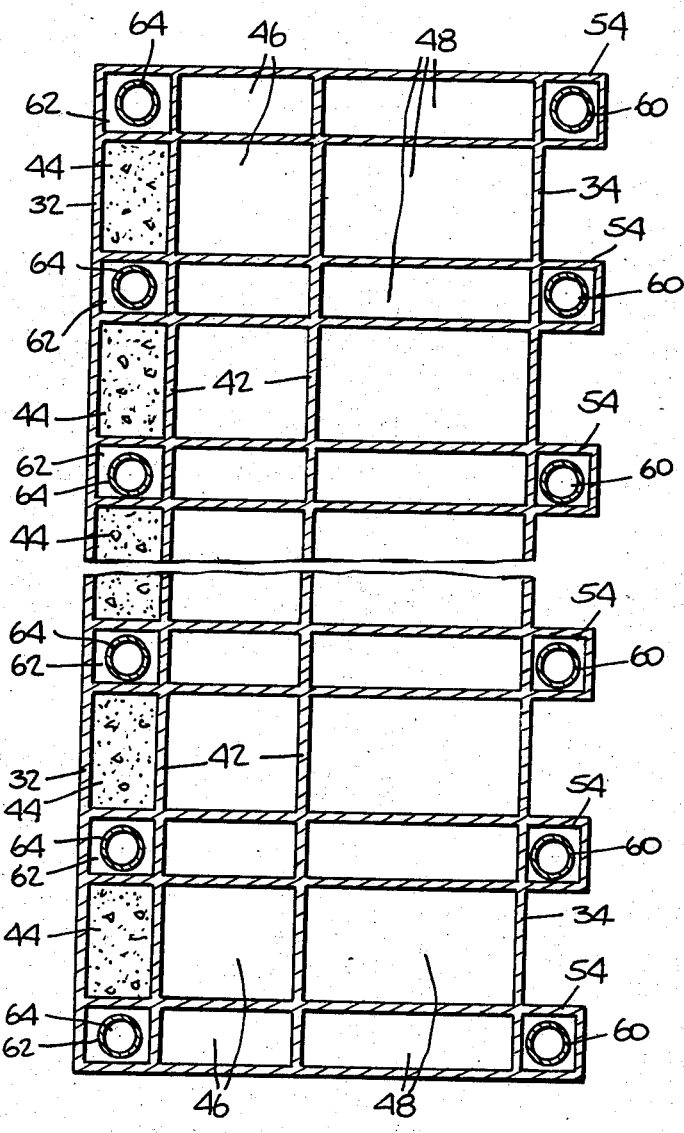
FIG. 5 is a horizontal section view, partially cut away, taken along line 5—5 of FIG. 4.

When the module 30 has been positioned on the sea bed 58 as above described, rear piles 60 are driven down through the rear pile housings 54 and into the sea bed therebelow as shown in FIG. 4. Additional front pile housings 62 are formed at spaced apart locations along the sea wall 34, as shown in FIG. 5; and forward piles 64 are driven down through these housings in the same manner. After the piles have all been driven they are solidly fixed to the module 30 by application of grout 66 inside the pile housings 54 and 62. It will be seen in FIG. 5 that the regions between the front pile housings 62 constitute the seawall compartments 44.

The piles 60 and 64, which are preferably prestressed concrete cylinder piles, do not perform any substantial vertical support function as do conventional piles. This is because the essential vertical support of the breakwater module 30 is obtained through the sea itself acting in conjunction with the essentially neutral buoyancy of the modules so that the modules do not press downwardly against the sea bed with any appreciable form. Instead, the piles 60 and 64 serve to resist lateral drifting of the modules due to wave action and sea currents and to accommodate a prestress on the module described hereinafter. Because of this the character of the sea bed 58 is not nearly so critical as in the case of conventional breakwater construction where the sea bed must resist very substantial vertical forces produced by the massive structure forming the breakwater.

While the piles 60 and 64 essentially resist lateral drifting they are preferably driven to a depth in the sea bed 58 where they will attain sufficient interaction with the sea bed to resist slight and short term vertical forces caused by buoyancy changes as the water level around the module 30 raises and lowers under the influence of waves and tides.

As shown in FIG. 4, at least some or all of the water in the various compartments 44, 46 and 48 is removed and is replaced by solid ballast, such as stone or concrete. Also, as can be seen in FIG. 4 the amount of ballast in the forward compartments 44 and 46 is greater than that in the aft compartments 48. While the total ballast weight is sufficient to result in substantially neutral overall buoyancy for the module 30, nevertheless the buoyancy distribution is such that a slight negative or sinking buoyancy occurs in the front portion of the module while a slight positive or floating buoyancy occurs along the rear rear portion. This separate establishment of the buoyancy compartments creates a couple which tends to rotate or tilt the module in a counterclockwise direction, as viewed in FIG. 4, and it prestresses the forward piles 64 in compression and the rearward piles 60 in tension. The degree of buoyancy shift must not, of course, exceed the ability of the sea bed 58 to resist these tension and compression forces.

It will be noted that the forces produced on the module 30 by the above described ballast shift tend to tilt the module in a direction counter to the direction of the forces produced on the module 30 by normal wave action from the sea. That is, sea waves impinging on the module 30 tend to force it back and roll it in a clockwise direction as viewed in FIG. 4. As these sea forces are imposed on the module, the stresses on the piles 60 and 64 and on the underlying sea bed are actually relieved and the breakwater is thus able to resist very substantial forces from the sea.

After the proper ballast and buoyancy adjustments have been made in the various compartments, the hatch covers 52 are replaced to close the hatches 50.

It will be seen from FIG. 5 that the various modules may be individually positioned side by side to form a continuous structure of any desired length and configuration. Also, because of the various divider walls provided in the different modules, a very rigid overall structure is attained; and the cells or compartments defined by the divider walls serve as individual elements controlling overall buoyancy. Thus if any one compartment should experience a buoyancy change due to a leak or other damage, only very slight effect will be produced on the overall breakwater structure.

Having thus described the invention with particular reference to the preferred forms thereof, it will be obvious to those skilled in the art to which the invention pertains, after understanding the invention, that various changes and modifications may be made therein without departing from the spirit and scope of the invention as defined by the claims appended hereto.

What is claimed and desired to be secured by letters patent is:

1. A breakwater structure comprising at least one module having an upstanding wall-like surface for resisting wave action, said module being positioned such that said wall-like surface extends from below the sea surface to a location above the sea surface for encountering sea waves, said module having front and rear portions displaced from each other in a direction transverse to the plane of said wall-like surface, and a plurality of pile members connected to and extending downwardly from said front and rear portions into engagement with the sea bed therebelow to a depth sufficient to attain resistance to lateral movement of said module and to resist vertical loading forces from said module, said rear portion of said module having greater buoyancy than said front portion and the pile members extending from the front portion of said module being subjected to a greater compressive stress than the pile members extending from the rear portion of said module whereby the module is enabled to counter the forces produced on said structure by wave action.

2. A breakwater structure according to claim 1 wherein said module is in the form of a closed container.

3. A breakwater structure according to claim 1 wherein said module is formed of concrete.

4. A breakwater structure according to claim 1 wherein said breakwater structure comprises a plurality of modules secured together.

5. A breakwater structure according to claim 1 wherein said wall-like surface extends from the sea bed up to a location above the surface of the sea.

6. A breakwater structure according to claim 1 wherein said pile members extend down into said sea bed a distance sufficient to resist upward forces on said module produced by changes in water level from tides and waves.

7. A breakwater structure according to claim 1 wherein said pile members are grouted into housings on said module.

8. A breakwater structure according to claim 1 wherein said module is formed with several compartments and wherein the buoyancy of the different compartments is separately established.

9. A breakwater structure according to claim 1 wherein the front portion of said module has negative buoyancy and the rear portion of said module has positive buoyancy.

10. A breakwater structure according to claim 1 wherein the wall-like surface extends along said front portion.

11. A method of constructing a breakwater, said method comprising the steps of floating a module having an upright wall to a desired position in the sea, sinking the module so that said wall extends from a location under the sea surface for engagement by sea waves, securing said module to a plurality of pile-like members driven down into the sea bed to a depth sufficient to resist lateral sea forces or said module, and thereafter adjusting the buoyancy distribution of said module so that it imposes a greater compressive stress in the pile-like members positioned further upstream of wave action than is produced in the pile-like members positioned further downstream of wave action and so that said module tends to tilt in a direction counter to the direction of forces produced by sea waves on said module.

12. A method of constructing a breakwater according to claim 11 wherein the buoyancy distribution of said module is adjusted by an amount sufficient to produce tensile stress in the pile-like members positioned further downstream of wave action and compressive stress in the pile-like members positioned further upstream of wave action.

13. A method of constructing a breakwater according to claim 11 wherein said module is sunk down to the sea bed.

14. A method of constructing a breakwater according to claim 11 wherein said pile-like members are driven down through housings on said module after it has been sunk and wherein said pile-like members are secured to said housings after being driven.

15. A method of constructing a breakwater according to claim 11 wherein a plurality of said modules are installed in similar manner adjacent to one another to form an elongated breakwater.

* * * * *